US012128425B2

(12) United States Patent
Vollert

(10) Patent No.: US 12,128,425 B2
(45) Date of Patent: *Oct. 29, 2024

(54) RECOVERING VALUABLE MATERIAL FROM AN ORE

(71) Applicant: Newcrest Mining Limited, Melbourne (AU)

(72) Inventor: Luke Vollert, Melbourne (AU)

(73) Assignee: Newcrest Mining Limited, Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,784

(22) Filed: Sep. 15, 2021

(65) Prior Publication Data

US 2022/0176387 A1 Jun. 9, 2022

Related U.S. Application Data

(63) Continuation of application No. 17/164,280, filed on Feb. 1, 2021, now Pat. No. 11,154,872, which is a continuation of application No. PCT/AU2019/050870, filed on Aug. 19, 2019.

(30) Foreign Application Priority Data

Aug. 24, 2018 (AU) .............................. 2018903118

(51) Int. Cl.
*B03D 1/02* (2006.01)
*B03D 1/14* (2006.01)

(52) U.S. Cl.
CPC .......... *B03D 1/025* (2013.01); *B03D 1/1462* (2013.01); *B03D 1/1493* (2013.01); *B03D 2203/025* (2013.01)

(58) Field of Classification Search
CPC ..................................................... B03D 1/025
See application file for complete search history.

(56) References Cited

U.S. PATENT DOCUMENTS 10,052,637 B2  8/2018  Mankosa et al.
2010/0018907 A1  1/2010  Niitti
(Continued)

FOREIGN PATENT DOCUMENTS

GB      401720 A     11/1933
WO   2015102638 A1   7/2015
(Continued)

OTHER PUBLICATIONS

B.A. Seaman and L. Vollert; "Recovery of Course Liberated Gold Particles Using Pneumatically Assisted Fluidized Bed Flotation;" The Conference of Metallurgists; World Gold & Nickel Cobalt; 2017; ISBN: 978-1-926872-36-0.

(Continued)

*Primary Examiner* — Peter Keyworth
(74) *Attorney, Agent, or Firm* — Dinsmore & Shohl LLP

(57) ABSTRACT

A method of recovering gold and copper from a sulfide ore includes (a) removing valuable fines from a product stream from a comminution circuit, such as a crushing and milling circuit, for run of mine ore and producing a valuable fines concentrate stream and (b) processing the remaining comminution product stream after valuable fines removal and producing a valuable coarse concentrate stream.

15 Claims, 10 Drawing Sheets

(56) References Cited

U.S. PATENT DOCUMENTS

2015/0182973 A1* 7/2015 Mankosa .................. B03B 5/28
                                                                                    209/12.1
2017/0326559 A1 11/2017 Filmer et al.

FOREIGN PATENT DOCUMENTS

| WO | 2016170437 A1 | 10/2016 |
| WO | 2017195008 A1 | 11/2017 |

OTHER PUBLICATIONS

International Search Report and Written Opinion dated Oct. 28, 2019 in related International Application No. PCT/AU2019/050870.

L. Vollert, et al.; "Newcrests Industry First Application of Eriez Hydrofloat Technology for Copper Recovery From Tailings At Cadia Valley Operations"; 2019.

Liza Forbes, et al., "Collaborative Research on Coarse Particle Processing," 2019.

* cited by examiner

RECOVERING VALUABLE MATERIAL FROM AN ORE

CROSS REFERENCES TO RELATED APPLICATIONS

This application is a continuation of U.S. patent application Ser. No. 17/164,280, filed Feb. 1, 2021, which is a continuation under 35 U.S.C. § 111(a) of International Application No. PCT/AU2019/050870 designating the United States, filed Aug. 19, 2019, which international application claims the benefit of priority to Australian Patent Application No. 2018903118, filed Aug. 24, 2018. Applications PCT/AU2019/050870 and 2018903118 are incorporated herein by reference in their entireties.

TECHNICAL FIELD

The invention relates to recovering valuable material from an ore. The invention relates particularly, although by no means exclusively, to recovering gold and copper from sulfide ore systems. The invention relates particularly, although by no means exclusively, to incorporating a coarse flotation element as described herein, such as an Eriez HydroFloat™ element, into a conventional plant for recovering gold and copper from sulfide ores.

BACKGROUND

Australian patent application 2014374469 entitled "Improved Material Processing System" in the name of Eriez Manufacturing Co. discloses a material processing system for processing tailings discharged from an ore processing system. Claim 1 of the Eriez patent application reads as follows:

"A material processing system for processing tailings discharged from an ore processing system, the tailings comprising coarse waste rock, fine waste rock, coarse valuable product, and fine valuable product, said material processing system comprising: a classification element, a coarse flotation element, and a fines flotation element arranged to separate the coarse valuable product, the coarse waste rock, the fine valuable product, and the fine waste rock; said classification element separates the coarse valuable rock, the coarse valuable product from the fine waste rock, the fine valuable product, or any combination thereof; said coarse flotation element separates the coarse waste rock from the coarse valuable product, the fine waste rock, the fine valuable product, or any combination thereof; and said fines flotation element separates the fine valuable product from the coarse waste rock, the fine waste rock, the coarse valuable product, or any combination thereof."

Basically, claim 1 of the Eriez application and the application as a whole discloses using a coarse flotation element to process "tailings discharged from an ore processing system."

The Eriez application describes that the "tailings" comprise "coarse waste rock, the fine waste rock, coarse valuable product, and the fine valuable product."

The Eriez application describes what is meant by the phrase "an ore processing system" in the Background section on page 1 of the application, as follows:

"Ore processing systems are used all over the world in the mining industry. These processing systems take ore and rock from mines and crush it to recover target valuable product that is taken to market and sold for profit. These ore processing systems typically recover 85-90% of the valuable product, meaning they do not recover 10-15% of the valuable product which remains in the waste tailings from the ore processing system. Unrecoverable loss occurs either because of the mass, shape, or other factors associated with the valuable product or the valuable product is unintentionally discharged from the system through the stream of waste rock. Losing valuable product of this magnitude equates to lost profit for the ore processing system . . . there is a need in the industry to improve recovery and collection of the lost valuable product in material processing systems. What is presented is an improved material processing system and methodology that processes tailings from ore processing systems to recover the valuable product unintentionally discharged from an ore processing system."

It is clear from the above passage that Eriez uses the term "tailings" to describe a waste stream from an ore processing system.

The applicant has carried out research and development work on incorporating a coarse flotation element, such as an Eriez HydroFloat™ coarse flotation element, into a conventional plant for recovering gold and copper from a sulfide ore system (more particularly a low-grade porphyry style copper-gold deposit).

The conventional plant includes a comminution circuit, such as a crushing and milling circuit (which may also be described as a "primary milling circuit"), that produces a comminution product stream from ROM ore and a fines flotation circuit that processes the comminution product stream and produces (a) a fines concentrate stream that contains gold and copper and (b) a tailings stream.

The recovery of gold and copper from a sulfide ore system presents particular issues because the concentrations of the gold and copper are typically very low and the significant proportion of the ore being processed is non-valuable gangue material.

For example, in the case of low-grade porphyry style copper-gold deposits, such as the Cadia mine of the applicant, typically the gold concentrations are less than 1 g/t and the copper concentrations are less than 0.5 wt. %.

The foregoing description is not an admission of the common general knowledge in Australia or elsewhere.

SUMMARY

The invention is based on a realization that it is possible to use a coarser comminution product stream in a gold and copper flotation circuit than was thought to be possible previously.

The result of this realization is an invention of a method and an apparatus for recovering gold and copper from a sulfide ore that is based on a combination of:
  (a) removing valuable fines containing gold and copper from a comminution product stream from a crushing and milling circuit for ROM ore and producing a valuable fines concentrate stream; and
  (b) processing a coarse fraction of at least a part of the remaining comminution product stream after valuable fines removal and producing a valuable coarse concentrate stream.

The invention is not confined to recovering gold and copper from a sulfide ore system and extends to recovering other valuable metals from different ores.

The invention is a different operating philosophy to that described in the Eriez application.

While the Eriez application focuses on processing a waste stream, i.e. waste tailings, the invention focuses on changing comminution of ore and producing a coarser comminution product stream that is processed downstream at least in part in a coarse particle flotation circuit, with coarse particle flotation becoming a primary component in processing the comminution product stream, i.e. the focus of the invention insofar as coarse flotation is concerned is more upstream than the focus of the Eriez application.

The invention provides in general terms a method of recovering gold and copper from a sulfide ore that includes:
(a) comminuting, for example by crushing and milling, the ore and producing a comminution product stream;
(b) removing fines as described herein from the comminution product stream, for example by passing the comminution product stream through an initial flotation element such as a fines flotation element, and producing (i) a valuable fines concentrate stream and (ii) a coarse flotation feed stream, with the coarse flotation feed stream comprising a valuable coarse material, a waste coarse material, and a waste fines material; and
(c) passing at least a part of the coarse flotation feed stream through a coarse flotation element as described herein and producing a valuable coarse concentrate stream and a tailings stream.

It is noted that the comminution product stream produced in the comminution, such as crushing and milling, the comminution of (a) is not a tailings stream as described in the Eriez application. The tailings stream produced in the coarse flotation of (c) is a tailings stream of the type described in the Eriez application.

Basically, the invention includes sequential valuable fines removal, for example via flotation, and valuable coarse removal via coarse flotation of the comminution product stream.

The invention includes valuable fines removal from the comminution product stream, for example via the use of a fines flotation element, such as conventional Outotec tank cells, in front of a coarse flotation element, such as Hydrofloat™ coarse flotation element.

Expressed another way, the invention includes the use of a coarse flotation element, such as Hydrofloat™ coarse flotation element, after a valuable fines removal, for example via a fines flotation element that processes ROM ore, with the valuable fines removal producing a coarse flotation feed stream that is processed in the coarse flotation element to recover a valuable coarse concentrate stream.

Operating with the fines flotation element in front of the coarse ore flotation element makes it possible to operate the method without a further fines flotation element. It is noted that the invention is not confined to this arrangement and extends to arrangements that include a further fines flotation element.

The method may include operating the fines removal of (b) so that there is minimal fines, for example less than 20 wt. %, typically less than 25%, and typically less than 30% of the total weight of the coarse flotation feed stream, in the coarse flotation feed stream.

The invention makes it possible to comminute, such as crush and mill, ROM ore to a coarser particle size distribution than is the case with the conventional plant described above and thereby avoid over-grinding that produces ultra-fines particles and minimize the amount of ultra-coarse particles as described herein.

The invention balances comminution, such as crushing and milling, and flotation to optimize flotation—the invention recognizes that coarse flotation, such as in a Hydrofloat™ coarse flotation element, makes it possible to reduce the extent of comminution, such as crushing and milling, that is required in a conventional plant and to operate with a coarser comminution product stream that allows effective initial gold and copper recovery via fines flotation and further gold and copper recovery via coarse flotation. This is not an outcome of the process described in the Eriez application.

More particularly:
(a) The invention makes it possible to operate with substantially reduced power usage with existing comminution, such as crushing and milling, equipment.
(b) The invention provides an opportunity to use smaller comminution, such as crushing and milling, equipment than would otherwise be required or significantly increased throughput with existing equipment.
(c) The invention allows increased amounts of coarse tailings to be generated with minimal ultra-fines particles and this makes it possible to have improved tailings disposal costs and to minimize the risks associated with tailings disposal. More particularly, the invention produces less fines waste and increased coarse waste, thereby allowing a significantly improved ability to generate a coarse fraction suitable for filtration and direct "dry stacking."

The foregoing advantages and opportunities resulting from the invention are significant in the context of comminution being a high proportion of mining costs and in the context of environmental issues associated with water use in flotation and disposal of tailings from flotation circuits.

With the invention, integration of a coarse ore flotation element, such as Hydrofloat™ flotation element, in a conventional plant described above is not complex from a flow sheet perspective—the invention includes straightforward sequential fines flotation and coarse flotation of a coarser comminution product stream.

The term "coarse flotation" is understood herein to mean flotation that separates valuable coarse material from waste coarse material.

The term "coarse" is understood herein to mean valuable material and waste material (i.e. gangue) having particle sizes in a range of 150 µm to 800 µm, typically 150 µm to 600 µm, in the context of recovering gold and copper from sulfide ore systems that are an optimum size for a coarse ore flotation element, such as a Hydrofloat™ coarse flotation element, and are larger than an optimum size for fines flotation.

The term "ultra-fines" is understood herein to mean valuable material and waste material having particle sizes that are less than an optimum size range for conventional flotation, i.e. mechanical or pneumatic flotation.

The term "fines" is understood herein to mean valuable material and waste material at the optimum size range for fines flotation.

The term "ultra-coarse" is understood herein to mean valuable material and waste material that are larger than an optimum size range for coarse ore flotation.

It is noted that the particle size distributions for "coarse," "ultra-fines," "fines," and "ultra-coarse" will vary depending on particular gold and copper mining operations and on mining operations for other valuable metals.

Typically, the coarse flotation of (c) floats gold and copper-containing particles and the resultant floated stream is the valuable coarse concentrate stream.

The method may include classifying the coarse flotation feed stream produced in the fines removal of (b) and producing a coarse stream and a fines stream and processing the coarse stream in the coarse flotation of (c).

The method may include operating the comminution of (a) and producing a predetermined particle size distribution in the comminution product stream that is suitable for processing in the fines removal of (b) and the coarse flotation of (c).

Typically, the particle size distribution has a coarser cut point (such as a coarser D50 cut point) when compared to a conventional comminution product stream, i.e. with a shift towards a higher percentage of coarser material in the comminution product stream.

The particle size distribution may include a substantial percentage, typically 35% to 70% by weight, typically at least 40% by weight, and more typically at least 45% by weight of the particles that are coarse particles, i.e. particles in a range of 150 µm to 800 µm.

Therefore, the method may include operating the comminution of (a) so that 35% to 70% by weight, typically 40% to 70%, more typically 45% to 70%, of the particles of the comminution product stream are coarse particles, i.e. particles in a range of 150 µm to 800 µm.

The method may include operating the comminution of (a) so that the predetermined particle size distribution of the comminution product stream is a p80 of 400 µm, typically a p80 of 350 µm, typically a p80 of 300 µm typically a p80 of 250 µm, typically a p80 of 230 µm, and more typically a p80 of 210 µm, noting that, by way of example, the particle size distribution of the comminution product stream of the comminution circuit of the conventional plant is typically a p80 of 150 µm. It is emphasized that the reference to p80 of 350 µm is not a limitation of the invention and coarser particle size distributions could be used depending on the ore mineralogy and other factors.

The invention may include classifying the comminution product stream into a coarse stream (i), typically p80≥75 µm to 100 µm, and a fines stream (ii), typically p80<75 µm to 100 µm.

The cut point for the above classification may be any suitable cut point and the above reference to a p80 of 75 µm is an example only.

The method may include processing the coarse stream (i) successively through the fines removal of (b) and the coarse flotation of (c).

The method may also include processing the fines stream (ii) in a fines flotation circuit and producing a valuable fines concentrate stream and a waste fines stream.

The method may include any suitable steps for recovering gold and copper from the valuable fines concentrate stream and the valuable coarse concentrate stream.

The sulfide ore system may be any deposit that contains gold and copper.

By way of example, the sulfide ore system may be a low-grade porphyry style copper-gold deposit, which typically has gold concentrations of less than 1 g/t and copper concentrations are less than 0.5 wt. %.

The invention includes a plant for recovering gold and copper from a sulfide ore that includes:
 (a) a fines removal circuit for removing valuable fines from a comminution product stream from a crushing and milling circuit for ROM ore and producing a valuable fines concentrate stream; and
 (b) a coarse flotation element for processing a coarse fraction of the remaining comminution product stream after valuable fines removal and producing a valuable coarse concentrate stream.

The invention also includes a plant for recovering gold and copper from a sulfide ore that includes:
 (a) a comminution, such as a crushing and milling, circuit for producing a comminution product stream having a predetermined particle size distribution;
 (b) a fines removal circuit for removing fines from the comminution product stream, for example including a fines flotation element, for producing (i) a valuable fines concentrate stream and (ii) a coarse flotation feed stream, with the coarse flotation feed stream comprising a valuable coarse material, a waste coarse material, and a waste fines material; and
 (c) a coarse flotation element for producing a valuable coarse concentrate stream and a tailings stream from the coarse flotation feed stream.

The plant may include a classifier for producing a coarse stream and a fines stream from the coarse flotation feed stream, with the coarse stream being a feed stream for the coarse flotation element.

The plant may include a recovery circuit for producing a final concentrate from the valuable fines concentrate stream and the valuable coarse concentrate stream.

BRIEF DESCRIPTION OF THE DRAWINGS

The invention is described further below by way of example only with reference to the accompanying drawings, of which.

DETAILED DESCRIPTION

The following description is divided into the following sections:
1. Description of Embodiments of FIGS. 1-3
2. Background to Pilot plant at the Cadia mine of the applicant
3. Pilot plant at the Cadia mine
4. Laboratory and pilot plant test work
5. Full scale plant
6. Conclusions

1. DESCRIPTION OF EMBODIMENTS OF FIGS. 1-3

The embodiments of the method and apparatus of the invention shown in FIGS. 1 to 3 and 12 are described in the context of recovering gold and copper from gold/copper-containing sulfide minerals in a sulfide ore system.

The embodiments include a combination of a fines flotation element, which may be mechanical or pneumatic, and a coarse flotation element, such as Hydrofloat™ coarse flotation element.

The fines flotation element acts as a high efficiency valuable fines removal system that removes a valuable fines stream, i.e. a stream containing gold and copper containing particles, from a comminution product stream of a comminution circuit in the form of a primary crushing and milling circuit for ROM ore that contains gold/copper-containing sulfide minerals.

The remaining comminution product stream that remains after valuable fines have been separated in the fines flotation element, which is described herein as a "coarse flotation feed stream," is classified to remove low-value fines from the coarse flotation feed stream.

The coarse flotation feed stream is then processed in a coarse flotation element that produces a valuable coarse concentrate stream, i.e. a stream containing gold and copper containing particles.

Figure 1:
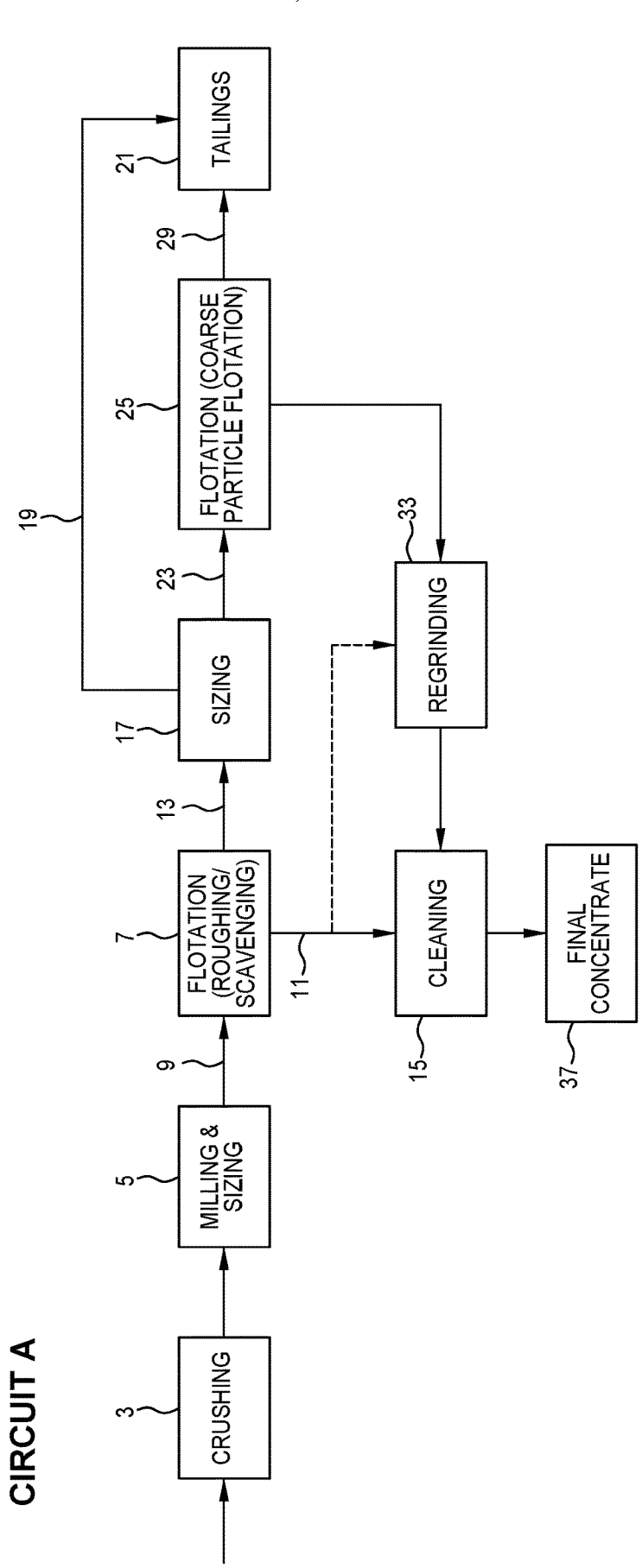
FIG. 1 is a flow sheet of one embodiment of a method and an apparatus of recovering gold and copper from sulfide ore systems in accordance with the invention.
Figure 2:
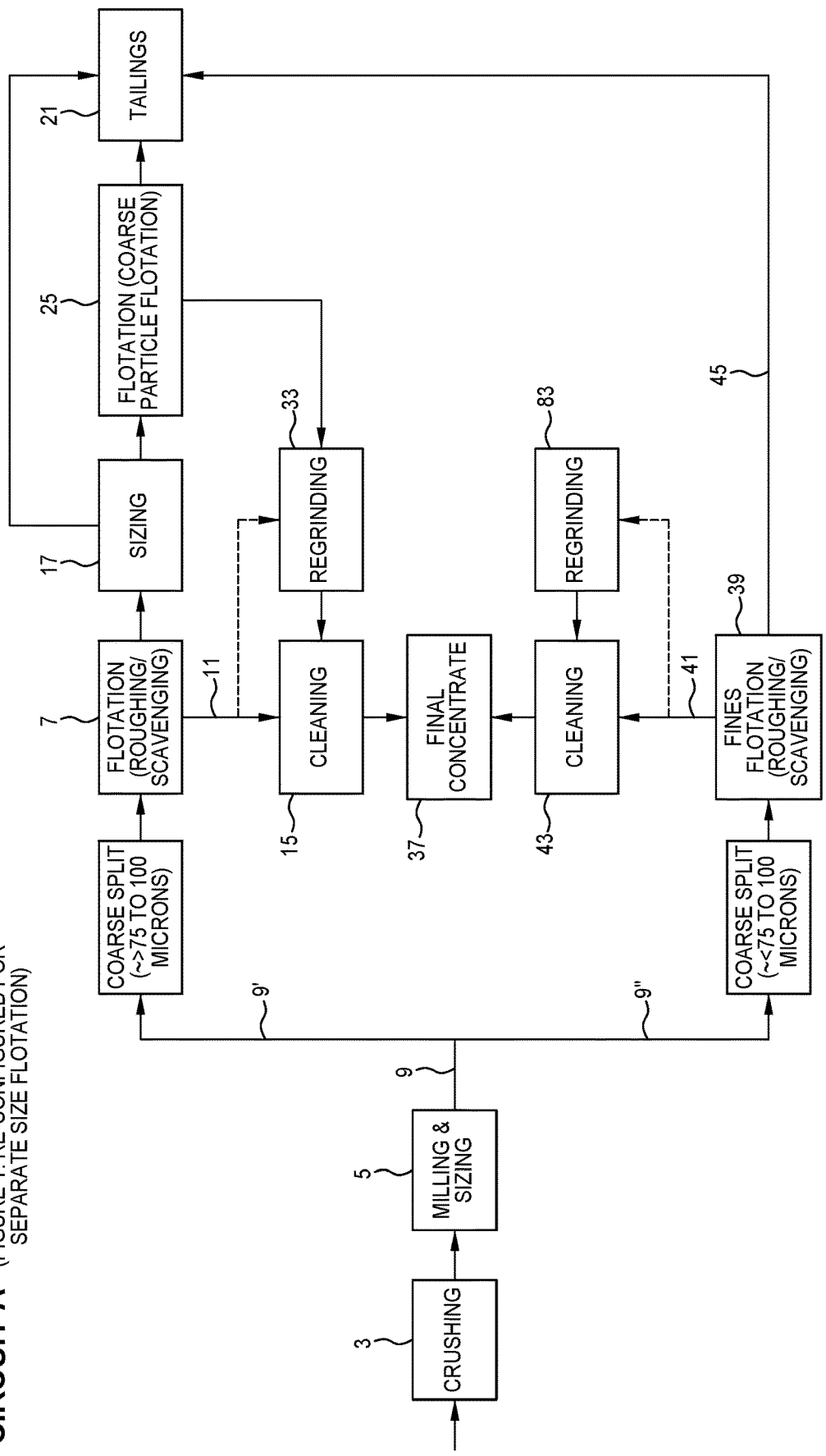
FIG. 2 is a flow sheet of another, although not the only other, embodiment of a method and apparatus of recovering gold and copper from sulfide ore systems in accordance with the invention.
Figure 3:
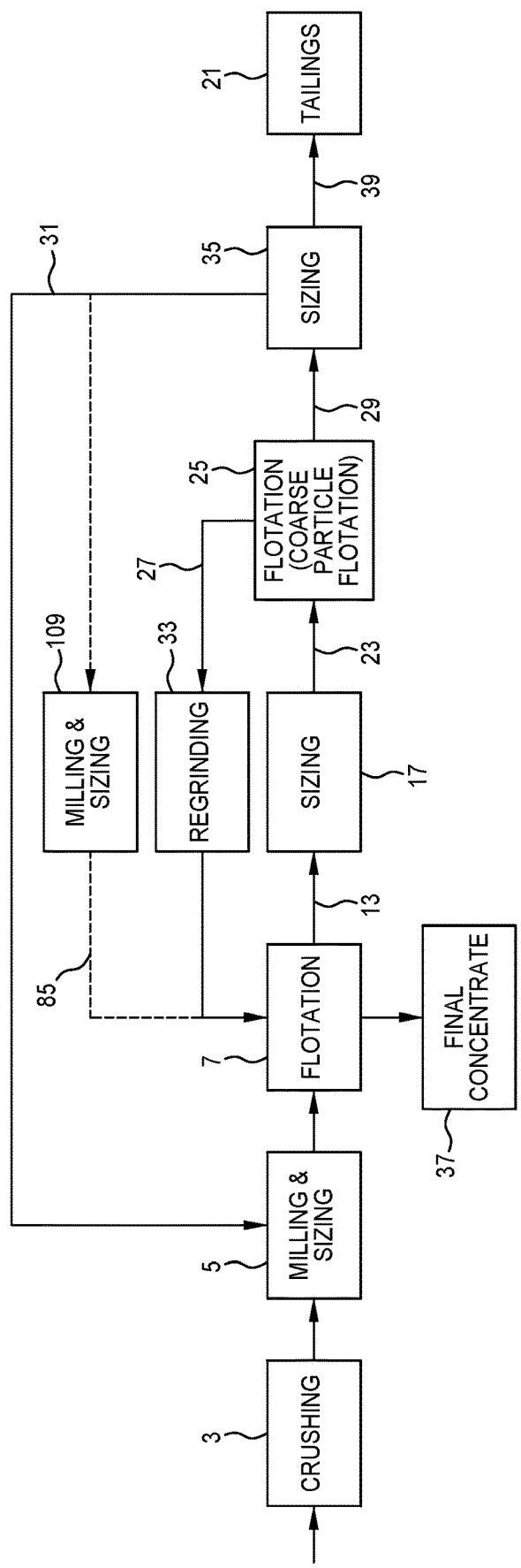
FIG. 3 is a flow sheet of another, although not the only other, embodiment of a method and apparatus of recovering gold and copper from sulfide ore systems in accordance with the invention.

The embodiments shown in FIGS. 1 to 3 considerably simplify the integration of a coarse flotation element, such as Hydrofloat™ coarse flotation element, into a conventional plant for recovering gold from gold/copper-containing sulfide minerals and are especially important as the embodiments allow easy retrofit into the conventional plant.

With the use of a coarse flotation element, such as a Hydrofloat™ coarse flotation element, where valuable/waste particle separation with only a small exposure of sulfides is required for recovery, the overgrinding and liberation in a comminution, such as a primary crushing and milling, circuit is not required, and power savings can be made.

The sequential use of fines flotation in front of coarse flotation in the embodiments shown in FIGS. 1 to 3 reduces the fines loading and duty on fines removal in front of coarse flotation.

The coarse flotation element in the embodiments shown in FIGS. 1 to 3 separates waste coarse material from valuable coarse material containing some minimum exposure of sulfides maintaining high gold (and copper) recoveries.

This change in operating philosophy, i.e. operating with (a) a fines flotation element that processes a comminution product stream of a comminution, such as a primary crushing and milling, circuit for ROM ore and (b) a coarse flotation element that processes a coarse flotation feed stream remaining after removal of valuable fines in the fines flotation element, makes it possible to achieve an increase in the tonnages processed for the given power installed thus effectively improving the circuit power efficiency by reducing the kWh/t while substantially maintaining recovery.

In a Greenfields plant, this change in operating philosophy makes it possible to achieve reduced capital and operating costs for a given throughput while substantially maintaining recovery.

The embodiments shown in FIGS. 1 to 3 operate a comminution circuit in the form of the primary crushing and milling circuit with a coarser cut point, such as a D50 cut point, without overgrinding of fines, and without excessive ultra-coarse material generation.

Figure 4:
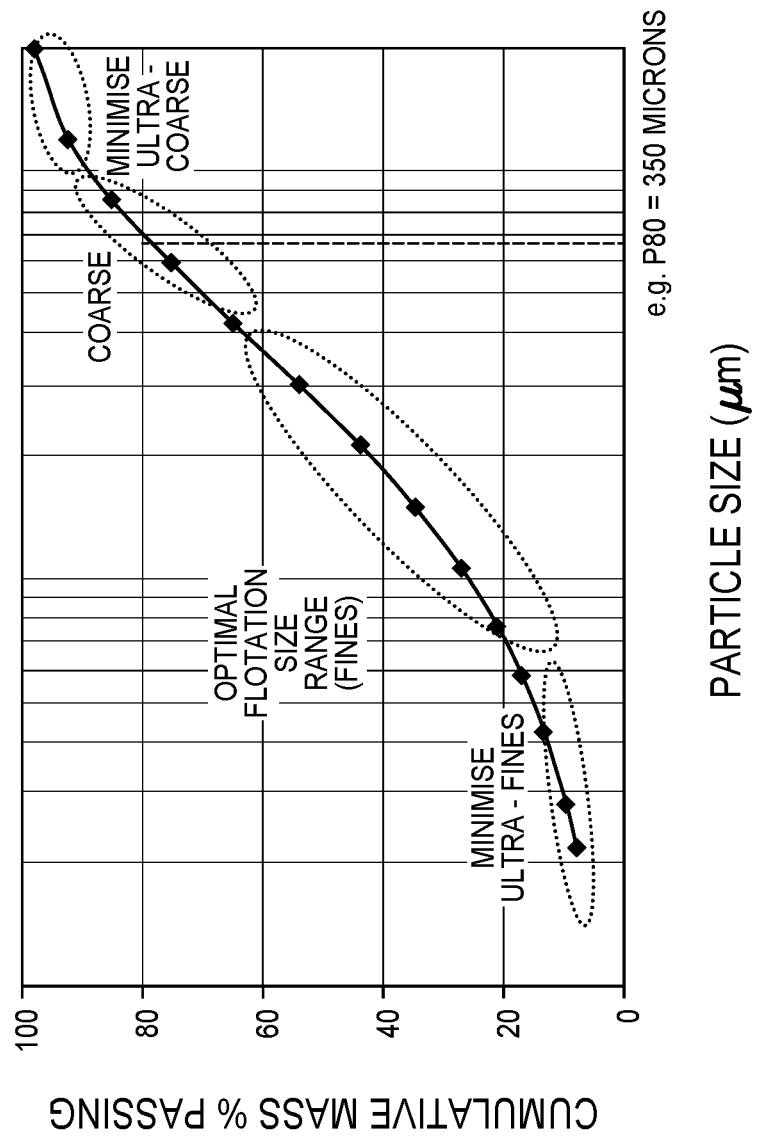
FIG. 4 is one example of a particle size distribution for a comminution product stream of the comminution circuit of the embodiments of the method and apparatus of the invention shown in FIGS. 1 to 3.

FIG. 4 illustrates an example of a particle size distribution of a comminution product stream of the comminution circuit of the embodiments shown in FIGS. 1 to 3 that is suitable for maximising the value of the coarse flotation element of the embodiments and can be processed efficiently because of the coarse flotation element.

FIG. 4 is a graph of cumulative % of the mass of particles in the comminution product stream versus particle size of the particles. FIG. 4 shows particles sizes ranging from fines to coarse. By way of example, FIG. 4 shows that the primary crushing and milling circuit was set up so that 80% of the particles by weight were ≤350 μm in the comminution product stream and there is a steep increase in the cumulative mass % of particles as the particle size increased from the D50 particle size towards the coarser end of the particle size distribution. Both observations indicate a move to a coarser particle size distribution compared to a conventional plant.

Figure 5:
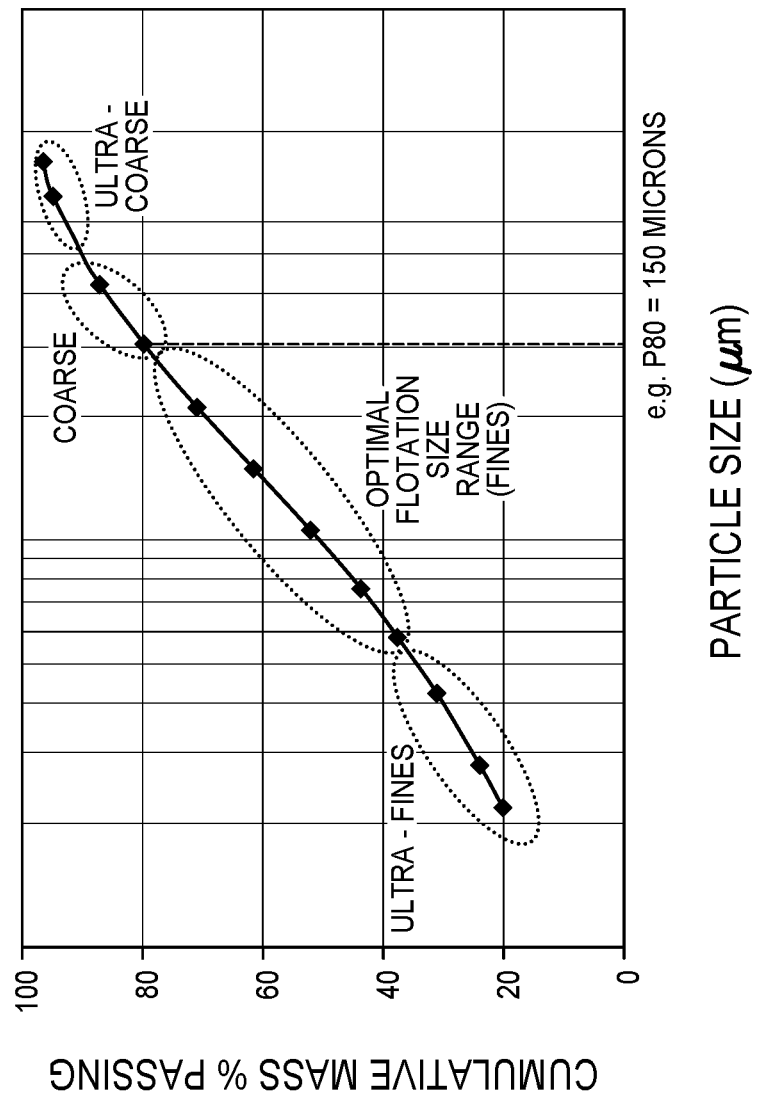
FIG. 5 is another example of a particle size distribution for a comminution product stream of the comminution circuit of the embodiments of the method and apparatus of the invention shown in FIGS. 1 to 3 and of a conventional plant for recovering gold and copper from sulfide ore systems, where the conventional plant includes a crushing and milling circuit that produces a comminution product stream.

The extent of the sharp classification in FIG. 4 is evident from a comparison of FIGS. 4 and 5.

FIG. 5 illustrates a flatter particle size distribution of a comminution product stream of the comminution circuit that is typical of a conventional plant and is also suitable for use in the embodiments shown in FIGS. 1 to 3.

In particular, a comparison of FIGS. 4 and 5 shows that (a) there is a higher p80 of 350 μm (which could be coarser) in FIG. 4 compared to a typical p80 of 150 μm or finer in the primary crushing and milling circuit of FIG. 5; and (b) a higher proportion, typically at least 60% by weight, of coarse material in the FIG. 4 particle size distribution compared to the amount of coarse material produced in the primary crushing and milling circuit of FIG. 5.

The comparison of FIGS. 4 and 5 indicates that when there is a coarse flotation element in accordance with the embodiments shown in FIGS. 1 to 3, it is not necessary to operate a primary crushing and milling circuit to the same extent as that of FIG. 5 to produce a particle size distribution that is effective for downstream processing to recover gold and copper.

More particularly, the use of the coarse flotation element makes it possible to operate the primary crushing and milling circuit in the embodiments shown in FIGS. 1 to 3 with a higher D50 cut point in the particle size distribution shown in FIG. 4 when compared to FIG. 5. The FIG. 4 particle size distribution makes it possible to maximize the use/value of coarse flotation to a greater extent than that of FIG. 5.

In general terms, the embodiments of the method shown in FIGS. 1 to 3 include:
(a) comminuting in the form of crushing and milling ore that contains gold/copper-containing sulfide minerals and producing a comminution product stream 9 (in the form of a slurry) having a predetermined particle size distribution (two predetermined particle size distributions in the case of the FIG. 2 embodiment);

(b) removing valuable fines by passing the comminution product stream 9 through a fines flotation element 7 and producing (i) a valuable fines concentrate stream 11 and (ii) a coarse flotation feed stream 13, with the coarse flotation feed stream comprising valuable coarse material, waste coarse material, and waste fines material;

(c) classifying the coarse flotation feed stream produced in (b) in a sizing step 17 and separating fines and coarse particles and thereby reducing the contained fines and producing a fines stream 19 and a coarse stream 23;

(d) passing the coarse stream 23 through a coarse flotation element 25 and producing a valuable coarse concentrate stream 27 and a tailings stream 29; and (e) processing the valuable fines concentrate stream 11 and the valuable coarse concentrate stream 27 and producing a final concentrate 37.

More particularly, the embodiments of the method and apparatus shown in FIGS. 1 to 3 include the following features described in relation to the Figures.

FIG. 1 Flowsheet

A comminution (in the form of a crushing and milling) circuit 3, 5, which may include single or multiple crushing steps 3 delivering crushed ROM ore to single or multiple milling and sizing steps 5 to produce the comminution product stream 9 having a desired particle size distribution having a p80 of ≥250 µm (preferably 320 µm to 350 µm).

The crushing step(s) 3 may be carried out using a combination of gyratory, cone and HPGR crushers (not shown in the Figures).

The milling step(s) of the milling/sizing steps 5 may be carried out, for example, in a SAG mill as a primary mill unit (not shown in the Figures).

The milling step(s) of the milling/sizing steps 5 may be carried out, for example, in a ball mill as a secondary mill (not shown in the Figures).

The comminution circuit 3, 5 may include additional recovery options (not shown in the Figures) such as flash flotation or gravity gold recovery.

The sizing step of the milling/sizing step 5 includes using a classifier that separates primary crushed material into the comminution product stream 9 and an oversize stream (not shown) and transfers the comminution product stream 9 for processing in downstream flotation steps. The oversize stream is transferred to a milling step for further comminution and then returned to the classifier.

The comminution product stream 9 from the comminution circuit 3, 5 comprises ultra-fines, fines, coarse, and ultra-coarse particles. Each of these categories of particles contains valuable material to different extents depending on the mineralogy of the ore being processed.

As described above in relation to FIGS. 4 and 5, the comminution circuit 3, 5 can produce a coarser particle size distribution with a higher p80 (350 µm in these embodiments) than conventional comminution circuits and a steeper particle size distribution around p80, with a result that there is more coarse material than is produced in conventional comminution circuits.

The comminution product stream 9 from the comminution circuit 3, 5 is a slurry that contains 30 wt. % to 40 wt. % solids. It is noted that the solids loading may be any suitable solids loading. The comminution product stream 9 is now described as a flotation circuit feed 9.

The comminution product stream 9 is transferred to the fines flotation step 7 (which includes roughing/scavenging) and produces the valuable fines concentrate stream 11.

The valuable fines concentrate stream 11 is transferred to a cleaning step 15 and is then processed and forms the final concentrate product 37.

Where necessary, the valuable fines concentrate stream 11 is reground prior to the cleaning step 15.

The remaining flotation circuit feed 9 (without valuable fines) from the fines flotation step 7 is the coarse flotation feed stream 13.

The coarse flotation feed stream 13 is transferred to the sizing step 17 that produces two output streams. One output stream is the fines stream 19, which is essentially waste material (typically fines <150 µm), and this fines stream, which is a tailings stream, is transferred to tailings 21 for tailings treatment. The other output stream is the coarse stream of valuable and waste material, and this coarse stream 23 is transferred to the coarse flotation step 25—for example carried out in a Hydrofloat™ coarse flotation element in the case of the embodiments shown in FIGS. 1 to 3 but could be any other suitable coarse flotation unit.

The coarse flotation step 25 produces the valuable coarse flotation concentrate stream 27 and the waste stream 29.

The valuable coarse flotation concentrate stream 27 is ground in a regrinding step 33 and then transferred to the cleaning step 15 and is then processed with the fines flotation concentrate stream 11 in the cleaning step 15 and transferred to a final concentrate product forming step 37.

The waste stream 29 is transferred to tailings 21 for tailings treatment.

FIG. 2 Flow Sheet

The flow sheet shown in FIG. 2 comprises the FIG. 1 flow sheet and additional unit operations described below. The same reference numerals are used to describe the same features in both Figures.

In particular, it is noted that the flow sheet includes the combination of the fines flotation step 7 (which includes roughing/scavenging) and the coarse flotation step 25 of the FIG. 1 flow sheet.

The comminution product stream 9 (also described as the flotation circuit feed 9) from the milling/sizing steps 5 is classified into a coarse split 9' of p80≥75 µm to 100 µm and a fines split 9" of p80<75 µm to 100 µm.

The coarse split 9' of p80≥75 µm to 100 µm is the comminution product stream 9 for the fines flotation step 7 and the other steps which form the FIG. 1 flow sheet.

The fines split 9" of p80 of <75 µm to 100 µm is supplied to a fines flotation circuit 39 (which includes roughing/scavenging) and produces a valuable fines concentrate stream 41 and a waste stream 45. The valuable fines concentrate stream 41 is transferred to a cleaning step 43 and is then processed and forms a part of the final concentrate product 37.

Where necessary, the valuable fines concentrate stream 41 is reground in a re-grinding step 83 prior to the cleaning step 43.

The waste stream 45 from the fines flotation circuit 39 is transferred to the tailings 21 for tailings treatment.

Splitting the comminution product stream 9 results in a decrease in downstream circuit classification duties for the coarse split 9' of p80≥75 µm to 100 µm. In other words, unlike the FIG. 1 flow sheet, only a proportion of the comminution product stream 9 is processed in the coarse flotation circuit. It is emphasized that the invention is not confined to a selection of the cut point of 75 µm.

The fines split 9″ goes to its own separate flotation circuit that can be tuned to maximise fines recovery (providing an opportunity for flexibility to use different equipment or reagents that are tailored to fines recovery).

FIG. 3 Flow Sheet

The flow sheet shown in FIG. 3 is similar to the FIG. 1 coarse flotation flow sheet. The same reference numerals are used to describe the same features in both Figures.

In particular, it is noted that the flow sheet includes the combination of the fines flotation step 7 (which includes roughing/scavenging) and the coarse flotation step 25 of the FIG. 1 flow sheet.

The FIG. 3 embodiment applies to situations where the comminution product stream 9 to the fines flotation (roughing/scavenging) step 7 has a substantial proportion of ultra-coarse particles and the value contained within this ultra-coarse fraction is considered to be significant.

The FIG. 3 embodiment includes a sizing step 35 for the waste stream 29 from the coarse flotation step 25 that separates ultra-coarse particles from the coarse particles in the waste stream 29 so that the ultra-coarse particles are not transferred directly to the tailings 21.

The ultra-coarse stream 31 from the sizing step 35 is transferred to the milling/sizing step 5 and is re-ground and returned to the fines flotation step 7 for at least another pass at fines flotation.

At least a part of the ultra-coarse stream 31 from the sizing step 35 may optionally be sized in a milling/sizing step 109 for removal of any remaining fine, entrained, barren particles and the milled/sized output stream is returned to the fines flotation step 7 for at least another pass at fines flotation.

The remaining waste stream 39 from the sizing step 35 is transferred to the tailings 21 for tailings treatment.

The coarse flotation concentrate stream 27 from the coarse flotation step 25 is re-ground in the re-grinding step 33 and the re-ground output stream 85 is returned to the fines flotation step 7 for at least another pass at fines flotation.

Though not shown, cleaning of the coarse flotation concentrate stream 27 may occur separately to the fines flotation concentrate stream following re-grinding.

The applicant has found in pilot plant work that the embodiment shown in FIG. 1 is an effective method and apparatus for recovering gold and copper from sulfide ore systems.

2. BACKGROUND TO PILOT PLANT AT THE CADIA MINE OF THE APPLICANT

The Cadia East ore body of the applicant is a low-grade porphyry style copper-gold and molybdenum deposit.

Copper mineralogy is dominantly chalcopyrite and bornite with strong non-sulfide gangue mineral association. There are two primary geo-metallurgical domains: namely (a) disseminated copper dominant mineralization which is predominant near the surface, and (b) sheeted veining which is localized around a core of steeply dipping sheeted quartz-calcite-bornite-chalcopyrite-molybdenite veins.

The ore processing facilities at the Cadia mine include two concentrator circuits (Concentrator 1 and Concentrator 2 circuits) which both treat Cadia East ore and produce a copper-gold flotation concentrate and gold bullion.

Figure 6:
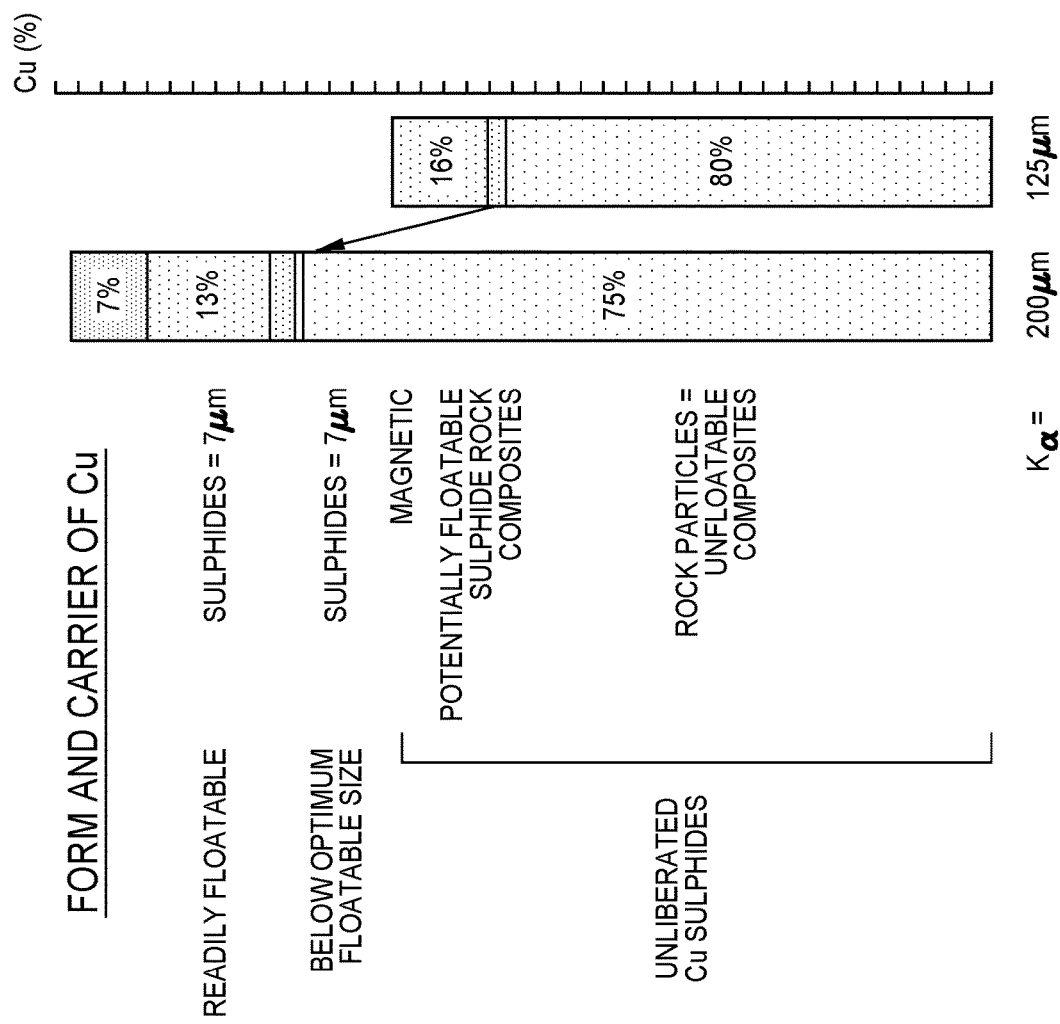
FIG. 6 shows the exposure of copper sulfides within copper sulfide bearing particles in the streams from the rougher flotation trains (i.e. the fines flotation trains) of the Concentrator 1 circuit for recovering gold and copper from sulfide ore systems at the Cadia mine of the applicant operating as a conventional flotation circuit (i.e. without coarse flotation after fines flotation)

FIG. 6 reports the results of routine mineralogical analysis of copper deportments in the flotation tails from the Concentrator 1 circuit operating as a conventional flotation circuit (i.e. without coarse flotation after fines flotation). The results were prepared by Advanced Mineral Technology Laboratory (AMTEL).

FIG. 6 shows finely disseminated locking of fine grained copper sulfides in gangue-mineral composite particles of the flotation tails being processed in the Concentrator 1 circuit as the main reason for copper losses from a conventional flotation circuit (without coarse flotation after fines flotation). The left hand column in FIG. 6 shows that, in the case of flotation tails having a $K_{80}$=200 micron, over 75% of the contained copper grade in the tailings is in particles that are conventionally described as being "unfloatable." It is clear from this column that there is a significant potential opportunity if gold in this part of the flotation tails can be recovered economically. The second column in FIG. 6 shows that further comminution of tailings to a $K_{80}$=150 micron reduces the amount of copper in the tailings, albeit with 80% of the contained copper grade being in the "unfloatable" fraction. However, even though the extra comminution has facilitated the release of copper from the tailings, this benefit has to be assessed against the cost of the comminution.

More particularly, the applicant has found that these composite particles are the principal carrier of copper in Concentrator 1 tailings with approximately 45% of copper contained in the plus 106 micron size fraction and 90% of those particles with less than 15% surface exposure of copper sulfide.

The floatability of these composite particles that have locked, i.e. unliberated copper sulfides, is controlled by the size, the degree of sulfide liberation and the spatial distribution/texture of the exposed sulfides. To demonstrate this effect, the calculated recovery data from sulfide liberation analysis by free surface of the Concentrator 1 flotation circuit operating as a conventional flotation circuit, is set out in Table 1.

TABLE 1

Conventional, fines, i.e. rougher, flotation recovery of composite particles for Cadia East ore

| Composites with | Recovery |
|---|---|
| >50% sulfide | 94% |
| 25% to 50% sulfide | 72% |
| 10% to 25% sulfide | 53% |
| <10% sulfide | 30% |
| overall | 52% |

Table 1 shows that as the size of the surface exposure decreases to less than 50%, and even more so to less than 25%, recovery of these composite particles within the conventional flotation circuit drops considerably.

The applicant recognized that the above flotation performance analysis presented a significant opportunity for the application of HydroFloat™ coarse flotation technology, on the basis that the technology can reduce the liberation threshold for recovery at coarse particle sizes through a fundamental change in cell design and the use of coarse flotation cells, such as HydroFloat™ flotation cells.

The recovery of coarse copper sulfide composite particles via flotation is a function of inherent ore body mineralogical properties, surface chemistry, and hydrodynamic conditions such as size of the particle, degree of hydrophobicity (contact angle), liberation of the copper sulfide, texture of the exposed copper sulfide, turbulence created via mechanical agitation of flotation slurries, and deceleration at the pulp-froth interface. These factors will now be discussed further.

Particle Size

It has been reported in the technical literature that, in the absence of turbulence, the maximum particle size which can be floated is primarily determined from a balance of capillary and gravitational forces. In a turbulent environment such as that found in a conventional flotation mechanical cell, the particle-bubble detachment process ultimately controls the maximum floatable size. Particle detachment has been shown to be a function of the stability of the particle-bubble aggregates driven by hydrophobic coverage of the particle surface, as measured by the contact angle.

The contact angle achieved on the surface of a mineral surface is a characteristic property of the collector and not the mineral surface. It has been reported in the technical literature that at typical collector additions the valuable mineral particles should all adsorb the same collector concentrations per unit of surface area and therefore possess the same contact angle. It has been determined that both fine and coarse particles require higher contact angles for flotation than intermediate particle sizes to overcome the detachment forces created by conventional mechanical agitation of flotation slurries.

Liberation and Texture

For a given sulfide mineral grain size, the degree of sulfide liberation/exposure decreases as particle size increases subsequently impacting the flotation response. It has been reported in the technical literature that it is not only the degree of liberation but also the liberation texture within the composite that influences coarse particle recovery.

The test work reported in the technical literature demonstrated a difference in recoverability of sphalerite bearing particles with varying locking textures. A simple locking texture gave higher recovery than a complex locking texture for an equivalent overall degree of liberation. It was theorized that this effect may be driven by the bubble contact with the exposed mineral surface, a simple texture would conceptually provide more continuous surface area for attachment.

Hydrodynamic Conditions

A mechanical flotation cell typically consists of three hydrodynamic zones to achieve effective mineral flotation, namely: (1) A turbulent zone created by the impeller/stator arrangement to simultaneously achieve solids suspension, dispersion of gas and bubble-particle contact; (2) A quiescent zone where bubble-particle aggregates rise though the pulp; and (3) A froth zone which aids in the separation of valuable bubble-particle aggregates from gangue particles suspended in the interstitial water between the bubbles.

Coarse particles, and in particular, coarse composite particles of low hydrophobic surface expression are highly susceptible to detachment due to the stability of the bubble-particle aggregate as discussed above. It has been reported in the technical literature that the presence of multiple zones within the same unit operation is detrimental to coarse composite flotation. Particle detachment can occur during acceleration or collisions in the turbulent zone created by the impeller as well as at the pulp-froth interface due to the change in momentum of bubble-particle aggregates striking the interface.

3. PILOT PLANT AT THE CADIA MINE

The applicant, with the assistance of Eriez, constructed and operated a confidential pilot plant at the Cadia mine of the applicant with objectives to: (a) assess the metallurgical performance of the HydroFloat™ cell on Cadia East ore and to demonstrate the ability to effectively recover coarse composite particles with low surface expression; and (b) investigate in general terms the technical and economic viability of the invention, particularly the combination of a fines flotation step 7 (which includes roughing/scavenging) and a coarse flotation step 25.

Figure 7:
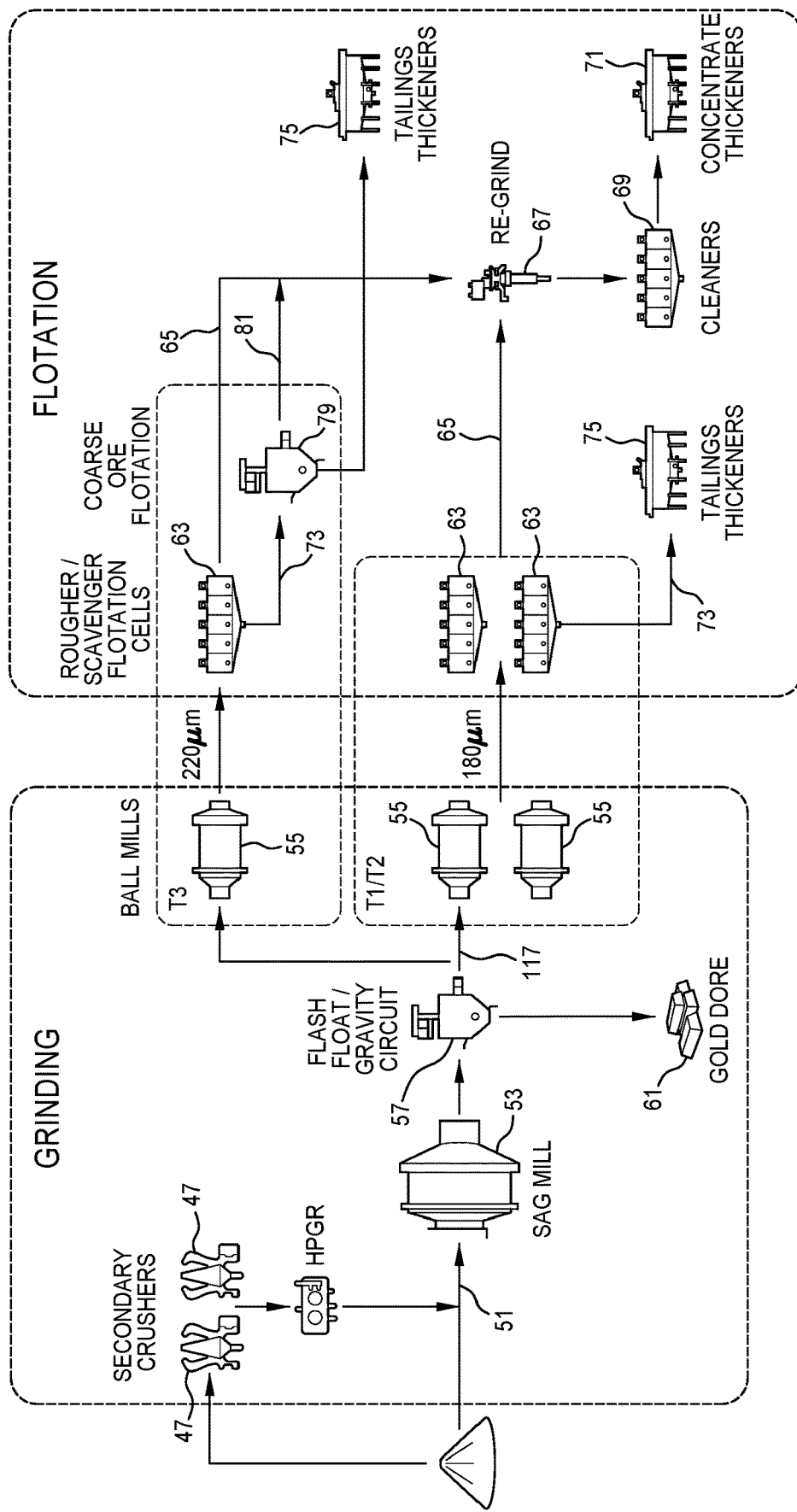
FIG. 7 is a simplified process flow diagram for the Concentrator 1 circuit as the concentrator circuit at the Cadia mine of the applicant was set up and operated as a confidential pilot plant by the applicant.

FIG. 7 is a simplified process flow diagram for Concentrator 1 circuit, as the concentrator was set up and operated as a pilot plant.

The process flow sheet of FIG. 7 is along the lines of the embodiment of FIG. 1.

With reference to FIG. 7, a comminution product stream in the form of a tertiary crushed product stream 51 produced in crushers 47 and a HPGR 49 is transferred to a single open circuit SAG mill 53 followed by three ball mills 55 (referred to as Trains 1, 2 and 3) in a closed circuit.

Within the ball mill circuits 55, flash flotation cells and centrifugal concentrators 57 treat primary cyclone underflow to target gravity gold, which is removed as a gold lore product 61.

The ball mills 55 supply a comminution product stream to dedicated rougher flotation circuits 63 (i.e. fines flotation circuits) made up of conventional Outotec tank cells and these circuits produce fines concentrate streams 65 and other streams 73 which contain waste fines, valuable coarse, and waste coarse particles.

The fines concentrate stream 65 from each rougher flotation circuit 63 is reground in Verti-Mills 67 and subsequently treated via two stages of cleaning employing a combination of Jameson cells and Outotec tank cells 69 to achieve a final concentrate grade. Concentrate is then thickened and filtered in thickeners 71 and then and freighted by rail to Port Kembla for shipment.

The other stream 73 from each rougher flotation circuit 63 is ultimately thickened in thickeners 75 and then pumped to wet tailings storage facilities (not shown).

The other stream 73 from the upper rougher flotation circuit 63 (T3) shown in FIG. 7, which can be described as a coarse flotation feed stream, is first subjected to a coarse flotation step (as described in relation to the FIG. 1 flow sheet) in a coarse flotation circuit 79 before the above-described processing step.

The coarse flotation circuit 79 produces a valuable coarse stream 81 that is transferred to the above-described re-grind, cleaner and concentrate thickener circuits 67, 69, 71.

An assessment of a range of operating parameters and performance indicators was made during the operation of the pilot plant.

4. LABORATORY AND PILOT PLANT TEST WORK

Laboratory and pilot plant test work programs were undertaken by the applicant with an objective of assessing the metallurgical performance of the HydroFloat™ cell on Cadia East ore and to demonstrate the ability of the cell to effectively recover coarse composite particles with low surface expression.

The test work included two programs: (1) Sighter pilot plant test work with the pilot plant described above at the Cadia mine; and (2) Eriez 6" HydroFloat™ laboratory test work at ALS Kamloops on Cadia East ore and tailings samples.

The HydroFloat™ pilot plant test work was commenced at the Cadia mine off the back of promising results from laboratory test work on feed samples.

The coarse flotation circuit 79 of the pilot plant shown in FIG. 7 included an Eriez 16" CrossFlow™ separator and an Eriez 12" HydroFloat™ flotation element.

The concentrate stream 73 from the upper rougher flotation circuit 63 (T3) was fed to an Eriez CrossFlow™ classifier (not shown) to remove fine material (−106 µm). The coarse underflow reported to a conditioning tank where reagents, potassium amyl xanthate (PAX) and 3418A, were added prior to flotation in the HydroFloat™ cell.

Size-by-size recovery analysis on the survey data collected demonstrated that the HydroFloat™ cell was able to recover coarse composite particles being missed by the conventional cells, with 31% of the copper and 28% of the gold in the fraction greater than 150 µm recovered with only 3% of the mass.

To further optimize operation for recovery, a 500-kg sample of rougher scavenger tailings from the upper rougher flotation circuit 63 (T3) was collected and tested in a laboratory HydroFloat™ test set-up at ALS Kamloops. The sample was screened at 106 µm with some of the fines re-introduced to generate a pseudo-classifier underflow stream for the test work. The sample is reflective of a typical concentrate stream 73 from the upper rougher flotation circuit 63 (T3). A single conventional flotation test and a series of HydroFloat™ tests were conducted on the prepared tailings sample using PAX as the collector and emulsified diesel as a collector extender.

Figure 8:
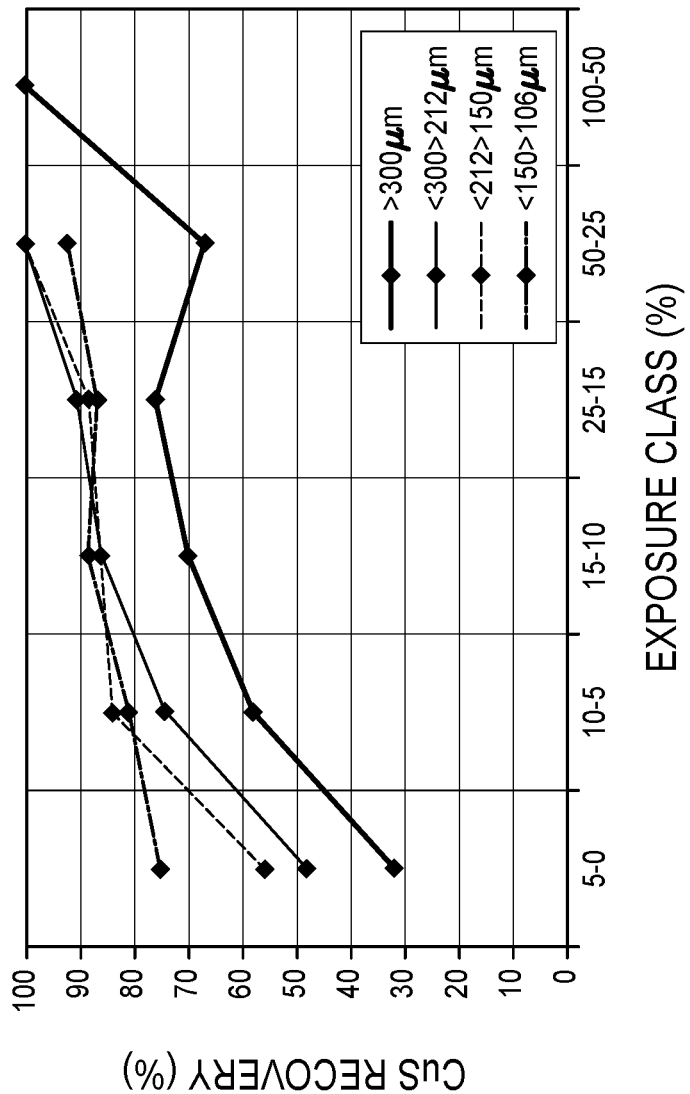
FIG. 8 is a graph of copper sulfide recovery versus exposure class for four particles size distributions.

FIG. 8 is a graph of copper sulfide recovery versus exposure class for four particles size distributions.

FIG. 8 shows that the HydroFloat™ cell can effectively scavenge composite particles with very low copper sulfide surface exposure from the existing flotation tailings stream.

With reference to the FIG. 8, particles with copper sulfide exposures greater than 10% were generally well recovered up to a top size of 300 µm. Above 300 µm, the recovery of particles with exposures lower than 50% was slightly lower. This result is likely to be an artifact of including the top size material in the coarsest size fraction (i.e., +600 µm). Recovery of copper sulfides in the low surface exposure classes was good considering the relatively low mass recoveries in the >150 µm size fractions.

Figure 9:
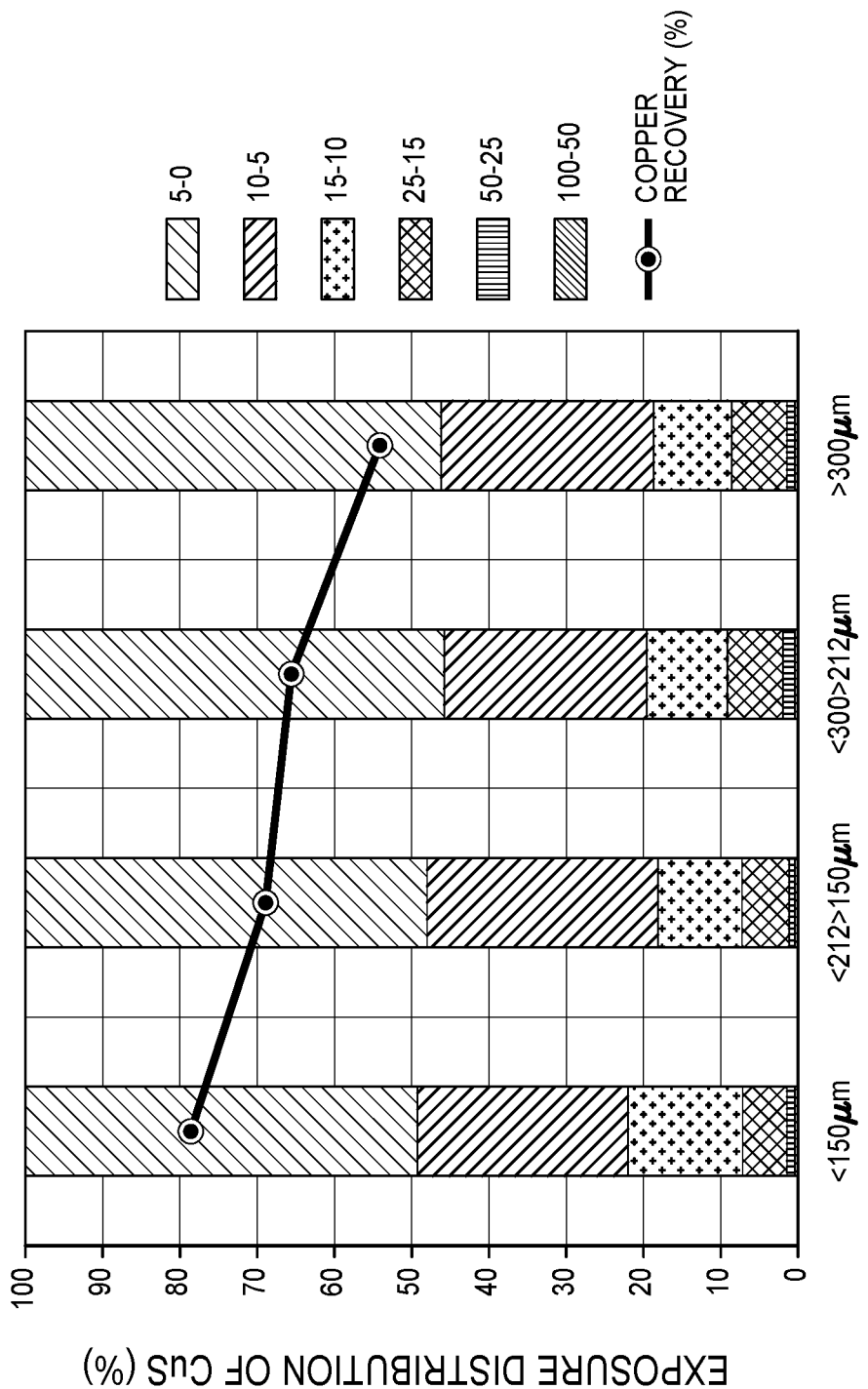
FIG. 9 is a graph of copper sulfide exposure distribution by size fraction with HydroFloat™ copper recovery overlaid on the graph.

FIG. 9 is a graph of copper sulfide exposure distribution by size fraction with HydroFloat™ copper recovery overlaid on the graph.

It is important to note that, when interpreting these results in FIG. 9, due to stereological effects, the copper sulfide surface exposures reported differ from the true surface exposure of the three-dimensional particles.

The data in FIG. 9 suggests that, by applying HydroFloat™ cell to Cadia East concentrate stream 73 from the upper rougher flotation circuit 63 (T3), the minimum required surface exposure to achieve flotation across size fractions up to 300 µm can be shifted to be less than 5%.

5. FULL SCALE PLANT

Circuit Design

Following successful test work results including the results described above, confidential concept level study work was carried out to assess the options for a full-scale installation of HydroFloat™ cells within the Cadia flowsheet.

Scavenging the existing comminution product stream from the fines flotation circuit after valuable fines removal presented a significant opportunity to demonstrate the technology in a lower risk environment while still delivering a robust economic case.

Efficient classification of the comminution product stream after valuable fines removal was considered to be important to the success of the HydroFloat™ circuit and formed the basis of the flowsheet options investigated. A total of three options for circuit configurations were considered during the preliminary engineering stage:

Option 1—Primary and secondary cycloning followed by HydroFloat™ processing.

Option 2—Primary cycloning followed by CrossFlow™ and HydroFloat™ processing.

Option 3—Primary and secondary cycloning followed by CrossFlow™ and HydroFloat™ processing.

Some of the key criteria that were considered when assessing each potential circuit option are (1)-(6) as follows:
 (1) Ability to easily bypass the circuit without impacting the upstream process.
 (2) A primary bank of cyclones is better equipped to conduct the initial classification stage as it will cope with the total circuit volume and any process fluctuations better than a teeter-bed separator.
 (3) Water supply requirements for each classification option needed to be considered along with any downstream processing requirements associated with the additional flowrates.
 (4) Utilizing cyclone underflow as feed to the HydroFloat™ cells added significant risk to the separation process as it was largely untested.
 (5) Utilizing a CrossFlow™ separator within the classification circuit would minimize the misplacement of fines to the coarse underflow which in turn reduces the mass of misplaced fines that will ultimately be entrainment to the HydroFloat™ concentrate.
 (6) High fines content in the HydroFloat™ product would require additional regrind circuit capacity.

Figure 10:
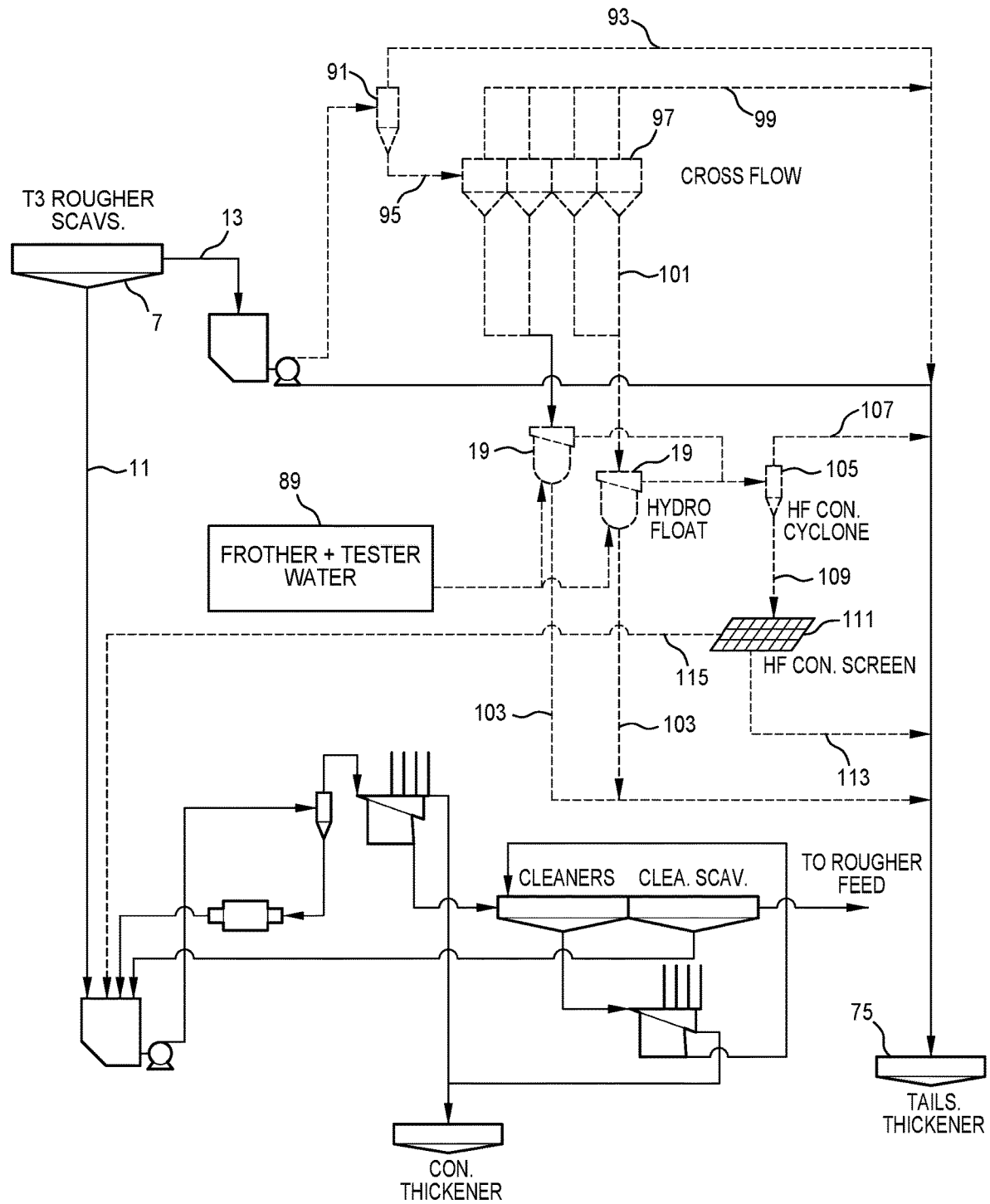
FIG. 10 is a flow sheet for a full-scale plant in accordance with one embodiment for recovering gold and copper from sulfide ore systems in accordance with the invention treating Cadia East ore at the Cadia mine of the applicant.

FIG. 10 is a flow sheet for a resultant option for a full scale plant in accordance with the invention for treating Cadia East ore at the Cadia mine.

With reference to FIG. 10, the existing Train 3 rougher tailings (i.e. from the fines flotation circuit 7) 13 is pumped to a cyclone pack 91 to remove—106 µm fines with as much water as possible.

Cyclone overflow 93 is directed to the existing Train 3 tailings thickener 75 and cyclone underflow 95 gravity feeds to four (4) Eriez CrossFlow™ separators 97 for further fines removal. Collector is also added in this step with chemical being added through the teeter water manifold which allows for counter-current conditioning.

CrossFlow™ overflow 99 goes to the existing Train 3 tailings thickener 75.

CrossFlow™ underflow 101 is gravity fed to two 3.4-meter diameter Eriez HydroFloat™ coarse flotation cells 19.

Process water, frother and air from storage units 89 are added to the HydroFloat™ cells 19. The HydroFloat™ tailings 103 are directed to the existing tailings thickener 75.

Concentrate is collected in the overflow launder and pumped to a dewatering cyclone 105. The overflow 107 from the dewatering cyclone 105 reports to the existing Train 3 tailings thickener and underflow (concentrate) is gravity fed to a Derrick StackSizer™ screen 111 to remove any entrained fines remaining and increase gold and copper concentrate grade. Undersize 113 from the StackSizer™ 111 is pumped to the existing Train 3 tailings thickener 75, oversize 115 is pumped with the overflow from the to the existing Train 3 concentrate (i.e. from the fines flotation circuit 7) to the regrind mill circuit, generally identified by the numeral 117.

Operation of the full-scale plant has been successful.

6. CONCLUSIONS

The applicant has successfully commissioned the first full-scale HydroFloat™ cells for the recovery of coarse composites of sulfide and gold.

The tailings scavenger installation on Train 3 in the Concentrator 1 circuit at Cadia Valley operations has been found to be a successful, low-risk, full-scale trial of fluidized-bed flotation technology.

With the introduction of coarse particle flotation using the HydroFloat™ coarse flotation element, recovery is not only increased for a given grind size, but also sustained at coarser grind-sizes. It has been demonstrated that the application of coarse flotation technology such as the HydroFloat™ coarse flotation element can fundamentally shift the economic optimum grind size in a comminution circuit to a coarser particle size distribution and increase cash flow.

Many modifications may be made to the embodiments of the invention described above without departing from the spirit and scope of the invention.

By way of example, though the embodiments are described in the context of gold and copper from sulfide ore systems, the invention is not so limited and extends to recovering any valuable metals from ores.

In addition, though the embodiments focus on a Hydrofloat™ coarse flotation element, the invention extends to any suitable coarse flotation element.

In addition, though the embodiments refer to the use of a SAG mill as a primary mill, the invention is not so limited and extends to any suitable comminution circuit.

In addition, though the embodiments include the use of a primary mill and a secondary mill, the invention is not so limited and extends to comminution circuits that are based on crushing step(s) only.

In addition, though the primary crushing and milling circuit in the embodiments include classification in accordance with FIG. 3 (with minimal over-grinding and minimal production of ultra-coarse fractions), the invention is not so limited and extends to comminution circuits of existing concentrators (as a retrofit) to achieve a benefit in increased throughput and/or reduced power.

In addition, though the embodiments include the sizing step 13 after the fines flotation step 7, the invention is not so limited and extends to embodiments that do not include this sizing step.

What is claimed is:

1. A method of recovering gold and copper from a sulfide ore, the method comprising:
    (a) comminuting the sulfide ore and producing a comminution product stream;
    (b) removing fines from the comminution product stream by passing at least a part of the comminution product stream directly from (a) through a fines flotation element and producing therefrom only two streams (i) and (ii):
        (i) a valuable fines concentrate stream comprising a valuable fines material, and
        (ii) a coarse flotation feed stream comprising a valuable coarse material, a waste coarse material, and a waste fines material; and
    (c) removing valuable coarse particles from the coarse flotation feed stream by passing the coarse flotation feed stream through a coarse flotation element and producing a valuable coarse concentrate stream and a tailings stream.

2. The method according to claim 1, further comprising, between (b) and (c):
    classifying the coarse flotation feed stream produced in (b) and producing a coarse stream and a fines stream; and
    removing valuable coarse particles from the coarse stream in (c).

3. The method according to claim 2, wherein removing fines in (b) comprises operating the fines removal to result in the coarse flotation feed stream containing less than 25 wt. % fines.

4. The method according to claim 2, wherein removing fines in (b) comprises operating the fines removal to result in the coarse flotation feed stream containing less than 20 wt. % fines.

5. The method according to claim 1, comprising operating the comminution of (a) so that a particle size distribution of the comminution product stream produced in the comminution of (a) is a p80 of 400 μm.

6. The method according to claim 1, wherein the valuable coarse material in the coarse flotation feed stream has particle sizes from 150 μm to 800 μm.

7. The method according to claim 1, wherein the valuable coarse material in the coarse flotation feed stream has particle sizes from 150 μm to 600 μm in the context of recovering gold and copper from sulfide ore systems.

8. The method according to claim 1, wherein the comminution of (a) comprises operating the comminution so that from 35% to 70% by weight of the comminution product stream are coarse particles with particle sizes from 150 μm to 800 μm.

9. The method according to claim 1, wherein the comminution of (a) comprises operating the comminution so that at least 40% by weight of the comminution product stream are coarse particles with particle sizes from 150 μm to 800 μm.

10. The method according to claim 1, wherein the comminution of (a) comprises operating the comminution so that at least 45% by weight of the comminution product stream are coarse particles with particle sizes from 150 μm to 800 μm.

11. The method according to claim 1, wherein the comminution of (a) comprises operating the comminution so that a predetermined particle size distribution of the comminution product stream produced in the comminution of (a) is a p80 of 350 μm.

12. The method according to claim 1, wherein the comminution of (a) comprises operating the comminution so that a predetermined particle size distribution of the comminution product stream produced in the comminution of (a) is a p80 of 300 μm.

13. The method according to claim 1, wherein the comminution of (a) comprises operating the comminution so that a predetermined particle size distribution of the comminution product stream produced in the comminution of (a) is a p80 of 250 μm.

14. The method of claim 1, wherein the sulfide ore comminuted in (a) is a run-of-mine sulfide ore.

15. A method of recovering gold and copper from a sulfide ore, the method comprising:
    (a) comminuting the sulfide ore and producing a comminution product stream;
    (b) removing fines from the comminution product stream by passing at least a part of the comminution product stream directly from (a) through a fines flotation element and producing therefrom only two streams (i) and (ii):
  (i) a valuable fines concentrate stream comprising a valuable fines material and
  (ii) a coarse flotation feed stream comprising a valuable coarse material, a waste coarse material, and a waste fines material;
(c) classifying the coarse flotation feed stream and producing a coarse stream and a fines stream, the coarse stream comprising the valuable coarse material and the waste coarse material; and
(d) removing valuable coarse particles from the coarse stream by passing the coarse stream through a coarse flotation element and producing a valuable coarse concentrate stream and a tailings stream.

* * * * *